Aug. 10, 1965
W. H. WOOD
3,199,903
SHOCK ABSORBING BEARING
Filed Dec. 23, 1963
2 Sheets-Sheet 1
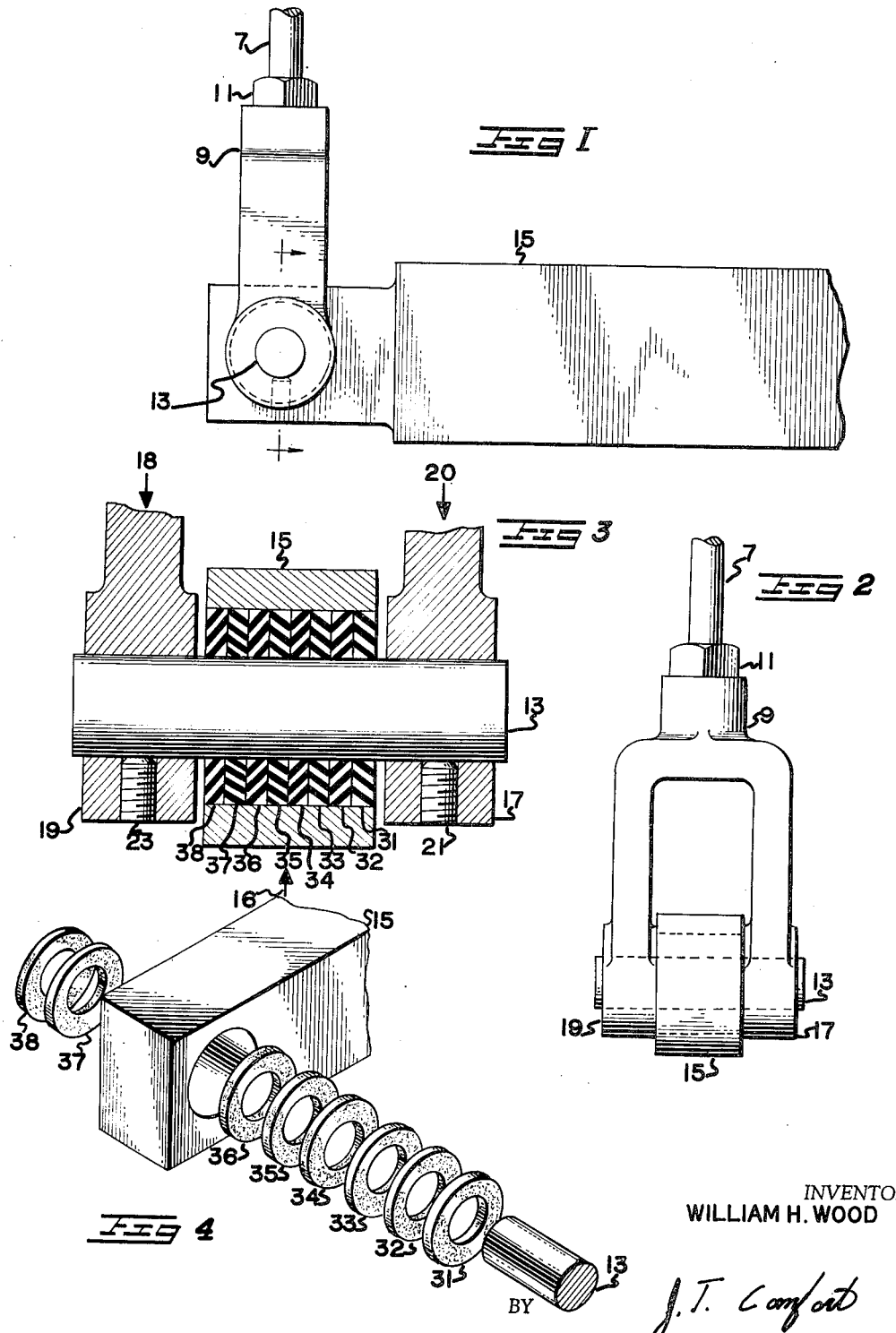
INVENTOR
WILLIAM H. WOOD
BY *J. T. Comfort*
ATTORNEY Aug. 10, 1965  W. H. WOOD  3,199,903
SHOCK ABSORBING BEARING
Filed Dec. 23, 1963  2 Sheets-Sheet 2

INVENTOR.
WILLIAM H. WOOD
BY
J. T. Comfort
ATTORNEY

3,199,903
SHOCK ABSORBING BEARING
William H. Wood, Roanoke, Va., assignor to General
Electric Company, a corporation of New York
Filed Dec. 23, 1963, Ser. No. 332,802
1 Claim. (Cl. 287—100)

This invention is directed to a shock absorbing bearing, and more particularly to a shock absorbing bearing for absorbing the shock between a connecting arm and clevis.

Very briefly then, a plurality of washers of a resilient material are inserted in one end of a connecting arm. The pin connecting the two ends of a clevis rotates in the plurality of washers of a resilient material. The bearing is loaded by pressure from the pin being applied to the edges of the washers, and misalignment is accommodated by bending of the washers in addition to compressing them. In another feature of this invention the diameters of the washers are varied to vary the vibration and shock absorbing force.

It is therefore an object of this invention to provide a new and improved shock absorbing bearing.

Another object of this invention is to provide a new and improved shock absorbing bearing for absorbing shock between a clevis, and a connecting arm.

It is another object of this invention to provide a new and improved shock absorbing bearing for absorbing the shock between a clevis and an arm to allow misalignment between the clevis and the arm.

Yet another object of this invention is to provide a new and improved shock absorbing bearing to vary the vibration and shock absorbing force between a clevis and an arm.

The invention is set forth with particularity in the appended claim. The principles and characteristics of the invention, as well as other objects and advantages are revealed and discussed through the medium of the illustrative embodiments appearing in the specification and drawings which follow. In the drawings:

FIGURE 1 is a side view of the clevis and the connecting arm.

FIGURE 2 is a front view of the clevis and the connecting arm.

FIGURE 3 is a cross section through the clevis, the arm, and the bearing along line A—B in FIGURE 1.

FIGURE 4 shows the washer and the pin removed from the connecting arm.

Figure 5:
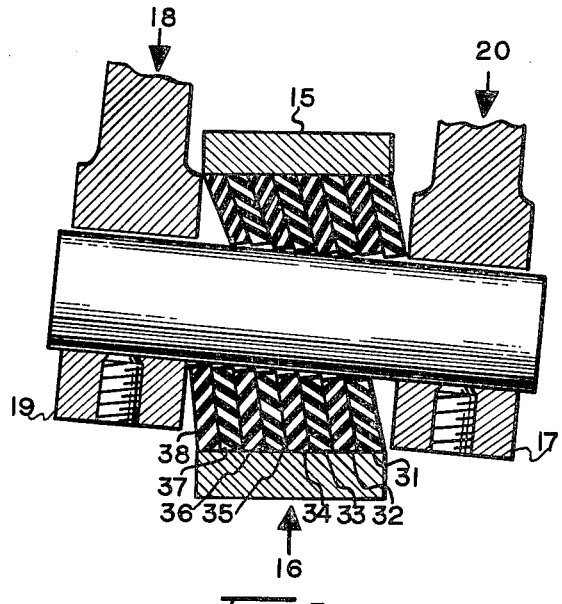
FIGURE 5 is a partial cross section along line A—B in FIGURE 1 through the clevis, the arm, and the bearing, showing the force applied to the bearing when there is misalignment between the clevis and the connecting arm.

Referring first to FIGURE 1, a connecting rod 7 is screwed into the clevis 9, and locked in by the lock nut 11. The clevis is connected to the arm 15 by a pin 13 through the two ends 17 and 19 of the clevis 9. FIGURE 2 shows a front view of the connecting rod 7 screwed into the clevis 9, locked in by the lock nut 11. The two ends 17 and 19 of the clevis 9 are connected to the arm 15 by the pin 13 inserted through the two ends 17 and 19 of the clevis 9 and the pin 13.

In FIGURE 3 the pin 13, two ends 17 and 19 of the clevis 9, and eight washers 31–38 are shown in cross section taken along the line A—B in FIGURE 1. The pin 13 is held in the two ends of the clevis 17 and 19 by set screws 21 and 23. The bearing in the arm 15 through which the pin 13 is inserted consists of eight washers 31–38. In FIGURE 4 the eight washers and the pin 13 are shown removed from the arm 15. The force applied to the clevis ends 17 and 19 is in the direction of the two arrows 18 and 20. The force applied to the arm 15 is in the direction of the arrow 16. In FIGURE 3, the forces applied to the clevis ends 17 and 19 and the arm 15 are in the same plane. In FIGURE 5, the forces applied to the clevis ends 17 and 19 and the arm 15 are not in the same plane, but the planes of the forces are at an acute angle with respect to each other resulting in a misalignment.

Figure 6:
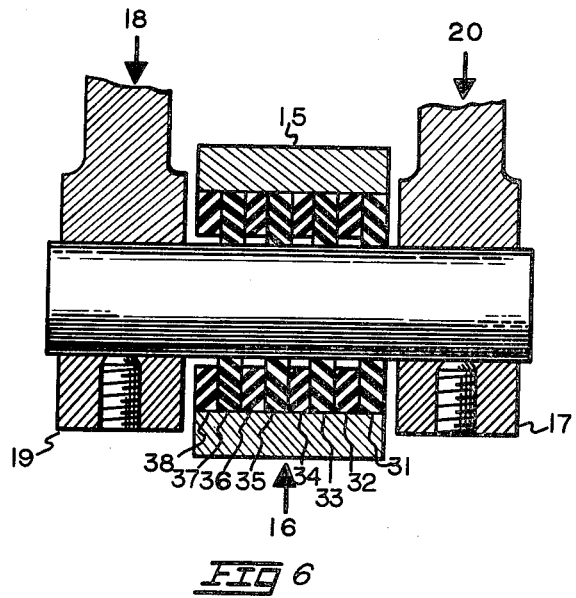
FIGURE 6 is a partial cross section through the bearing and the arm showing an embodiment of the invention where the washers in the bearing have varying diameters.

In FIGURE 6, the washers have different diameters. Washers 31, 33, 35, and 37 have one diameter, and washers 32, 34, 36, and 38 have a different diameter.

The eight washers 31–38 are fabricated in a donut shape, and then assembled inside the hole within the arm 15. The washers are of a resilient material such as rubber, or a resilient plastic.

The bearing washers 31–38 are loaded by pressure from the pin 13 being applied to the edges of the washers 31–38. The clevis 9 and the arm 15 have tendency to move out of alignment during relative movement as shown in FIGURE 5. During misalignment the washers 31–38 bend as well as compress, as shown in FIGURE 5. The force needed to bend the washers is much less than the compression force, and the washer bearing allows a greater misalignment with the same resultant force in the moving parts. Also the washer bearing allows the same misalignment with a much lower resultant force.

By varying the inside diameter of the washers as shown in FIGURE 6, the vibration and shock absorbing force may be changed. In this manner only one half of the washers are loaded at the time of initial shock, and therefore the first shock wave is more damped than when all washers are loaded at the same time. This can be varied by having three or more different diameters of the washers.

In summary a new and improved shock absorbing bearing for absorbing the shock between a connecting arm and clevis has been described. The shock absorbing device provides for misalignment between the clevis and the connecting arm.

While the invention has been explained and described with the aid of particular embodiments thereof, it will be understood that the invention is not limited thereby, and that many modifications retaining and utilizing the spirit thereof without departing essentially therefrom will occur to those skilled in the art of applying the invention to specific operating environments and conditions. It is therefore contemplated by the appended claim to cover all such modifications as fall within the scope and spirit of the invention.

What is claimed is:

In a shock absorbing device for absorbing the shock between a connecting arm having an eye at one end and a clevis having spaced arms receiving said eye therebetween and the arms of the clevis having apertures axially aligned with the eye, a plurality of donut shaped washers of varying inside diameters fitted together in the end of the connecting arm eye, a pin connecting the spaced arms of the clevis and extending through the said apertures and through said plurality of rubber donut shaped washers, with alternate washers engaging the pin and eye with their inner and outer peripheries respectively and the remaining washers engaging the eye with their outer peripheries and having their inner peripheries larger than the diameter thereof and spaced from the outer periphery of the pin, and set screws set in the ends of the connecting arm to hold said pin in the apertures therein.

References Cited by the Examiner

UNITED STATES PATENTS

| | | | |
|---|---|---|---|
| 1,322,748 | 11/19 | Bachman | 287—20 |
| 1,774,219 | 8/30 | Ackerman | 287—20 |
| 2,238,197 | 4/41 | Watson | 308—238 X |
| 2,896,234 | 7/59 | Hennefer | 308—238 X |

FOREIGN PATENTS

| | | |
|---|---|---|
| 213,019 | 3/24 | Great Britain. |

CARL W. TOMLIN, *Primary Examiner.*